Figure 1:
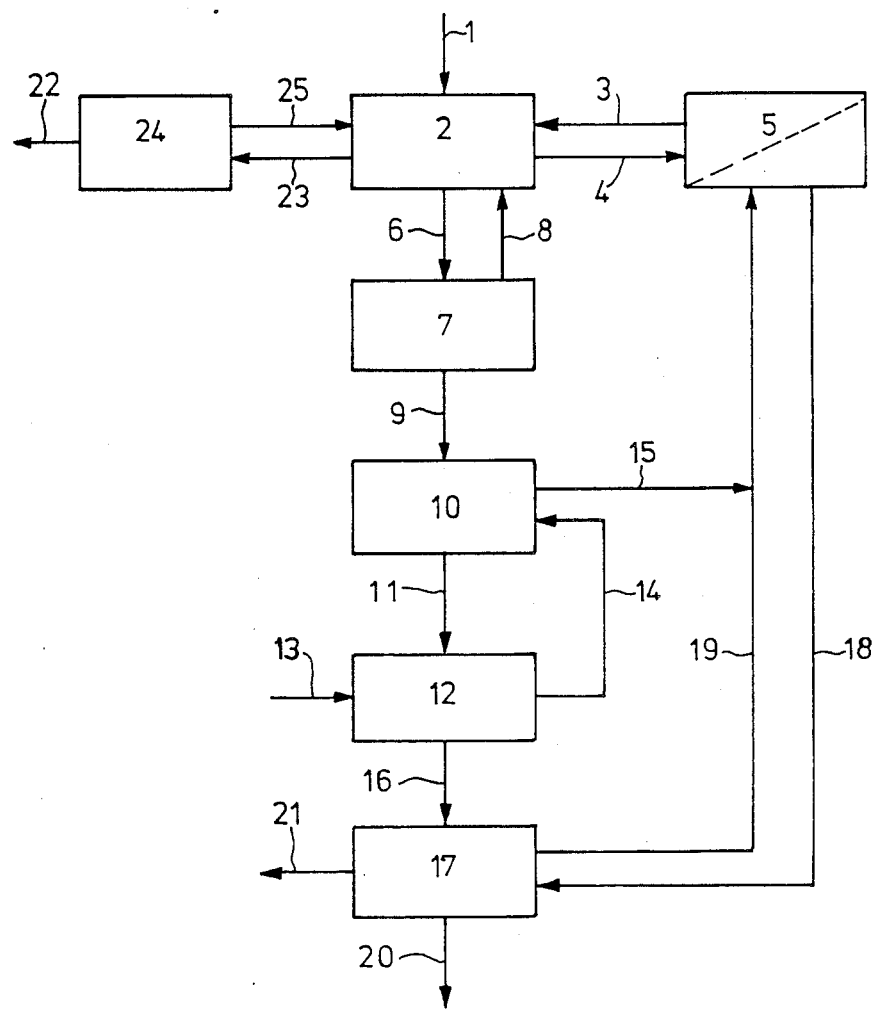

United States Patent [19]

Lailach et al.

[11] Patent Number: 4,931,269
[45] Date of Patent: Jun. 5, 1990

[54] PROCESS FOR THE PURIFICATION AND REHEATING OF EXHAUST GASES

[75] Inventors: Günter Lailach; Rudolf Gerken, both of Krefeld, Fed. Rep. of Germany

[73] Assignee: Bayer Aktiengesellschaft, Leverkusen, Fed. Rep. of Germany

[21] Appl. No.: 262,144

[22] Filed: Oct. 21, 1988

Related U.S. Application Data

[63] Continuation of Ser. No. 89,889, Aug. 27, 1987, abandoned.

[30] Foreign Application Priority Data

Sep. 2, 1986 [DE] Fed. Rep. of Germany ....... 3629766

[51] Int. Cl.$^5$ .................... C01B 17/98; C01B 17/00
[52] U.S. Cl. .................................. 423/522; 423/242
[58] Field of Search ............... 423/522, 242 R, 242 A

[56] References Cited

U.S. PATENT DOCUMENTS

| | | | |
|---|---|---|---|
| 3,519,388 | 7/1970 | Rinckhoff et al. | 23/167 |
| 3,917,798 | 11/1975 | Konopik et al. | 423/242 R |
| 3,944,401 | 3/1976 | Dörr et al. | 423/242 R |
| 3,987,153 | 10/1976 | Stiles | 423/535 |
| 4,329,155 | 5/1982 | Schlegel | 422/241 |
| 4,659,556 | 4/1987 | Eros | 423/522 |
| 4,670,235 | 6/1987 | Lailach et al. | 423/522 |

FOREIGN PATENT DOCUMENTS

| | | |
|---|---|---|
| 0177806 | 4/1986 | European Pat. Off. . |
| 670966 | 1/1939 | Fed. Rep. of Germany . |
| 1135868 | 9/1962 | Fed. Rep. of Germany . |
| 1314330 | 2/1961 | France .............. 423/242 R |
| 2238669 | 2/1975 | France . |
| 744465 | 2/1956 | United Kingdom . |

OTHER PUBLICATIONS

Perry et al., "Chemical Engineers' Handbook", 5th Ed., pp. 18-49, 9-41, 18-82 to 18-92.

*Primary Examiner*—Gregory A. Heller
*Attorney, Agent, or Firm*—Sprung Horn Kramer & Woods

[57] ABSTRACT

A process for the removal of dust and sulphur dioxide from hot exhaust gases which have a low hydrogen halide content and the reheating of the purified exhaust gases, wherein (a) the hot exhaust gases are cooled to temperatures below 135° C. by scrubbing with sulphuric acid, (b) sulphuric acid containing solids and dissolved metal sulphates is then separated from the exhaust gases from (a), (c) the exhaust gases from (b) are cooled to temperatures of 50° to 70° C. by scrubbing with 15 to 50% sulphuric acid, (d) and desulphurized with the formation of sulphuric acid, (e) and reheated to temperatures of 70° to 90° C. by scrubbing with 50 to 65% sulphuric acid while the sulphuric acid discharged from (c) is concentrated and (f) the sulphuric acid from stage (a) together with the solid particles contained therein is cooled with the pure sulphuric acid from (e) in heat exchangers.

The process according to the invention is particularly suitable for the purification of hot exhaust gases which are at a temperature of 170° to 500° C.

7 Claims, 1 Drawing Sheet

PROCESS FOR THE PURIFICATION AND REHEATING OF EXHAUST GASES

This application is a continuation of application Ser. No. 089,889, filed 8-27-87, now abandoned.

The present invention relates to a process for removing dust and sulphur dioxide from hot exhaust gases which have a low hydrogen halide content and reheating the purified exhaust gases.

An advantageous process for the desulphurization of exhaust gases containing hydrogen halides by which economically utilizable sulphuric acid is obtained as a reaction product is disclosed in EP-A 177,806. This sulphuric acid, however, cannot be widely used owing to the heavy metals which are dissolved out of the dust as sulphates which slightly contaminate the sulphuric acid produced. In exhaust gases obtained from oil burning, this problem is serious on account of the high vanadium and nickel contents of the ash.

It is an object of the present invention to provide a simple and economical process by which pure sulphuric acid which can be widely used is obtained as a by-product.

This problem is solved by the process described below. The invention relates to a process for the removal of dust and sulphur dioxide from hot exhaust gases which have a low hydrogen halide content and the reheating of the purified exhaust gases, characterised in that (a) the exhaust gases are cooled to temperatures below 135° C. by scrubbing with sulphuric acid,
(b) sulphuric acid containing solids and dissolved metal sulphates is then separated from the exhaust gases,
(c) the exhaust gases are cooled to temperatures of 50° to 70° C. by scrubbing with 15 to 50% sulphuric acid,
(d) and desulphurized with the formation of sulphuric acid,
(e) and reheated to temperatures of 70° to 90° C. by scrubbing with 50 to 65% sulphuric acid while the sulphuric acid discharged from (c) is concentrated and
(f) the sulphuric acid from stage (a) together with the solid particles contained therein is cooled with the pure sulphuric acid from (e) in heat exchangers.

The process according to the invention is particularly suitable for the purification of hot exhaust gases while are at a temperature of 170° to 500° C.

Cooling of the exhaust gases by scrubbing in stage (a) is preferably carried out by means of 70 to 80% sulphuric acid containing metal sulphates and solid particles. Cooling of the exhaust gases in stage (a) is preferably carried to temperatures in the region of 100° to 130° C.

The state of the art provides various possibilities for carrying out the individual stages of the process. Venturi scrubbers, jet scrubbers and scrubbing towers with nozzle grates are preferably used for scrubbing the dust-laden gases because these apparatus do not give rise to any problems due to the deposition of solid substances.

The separation of droplets in process step (b) is preferably carried out in mist separators, in particular laminar separators. Very good results are obtained with laminar separators of PVDF (polyvinylidene difluoride). The contaminated sulphuric acid which is separated is preferably returned to scrubbing process (a).

In a particularly preferred embodiment of the process according to the invention, the solids are removed in step (a) by being separated from a partial stream of the sulphuric acid corresponding on average to 0.2 to 10%, preferably 1 to 5% of the volume circulating through this scrubber.

The process according to the invention enables the purification and reheating of furnace gas to be combined with the production of pure and widely usable sulphuric acid with a minimum of expenditure in apparatus and energy.

The process according to the invention will now be described with reference to FIG. 1 for a case in which catalytic oxidation of $SO_2$ is used as a method of desulphurization.

Dust laden furnace gas (1) at a temperature of 140° to 200° C. is scrubbed free from dust in the scrubber (2) by means of 70 to 80% sulphuric acid (3) which contains solid particles, and the scrubbed furnace gas is thereby cooled to 100° to 135° C. The sulphuric acid (4) leaving the scrubber (2) is cooled by 5 to 30 K. in the heat exchanger (5) before being returned to the scrubber (2).

Droplets of the 70 to 80% sulphuric acid containing solid particles and metal sulphates are separated from the cooled furnace gas (6) by means of a mist separator (7) and returned (8) to the scrubber (2).

The furnace gas (9) which is now free from solid particles and is at a temperature of 100° to 135° C. is cooled to 50° to 70° C. in a second scrubber (10) by means of 15 to 50% sulphuric acid which is kept in circulation. The cooled furnace gas (11) which is to a large extent saturated with steam is introduced into a reactor (12) in which the sulphur dioxide is converted into sulphuric acid by contact with active charcoal.

In a particularly preferred embodiment of this process according to the invention, therefore, the formation of sulphuric acid in step (d) is carried out by a catalytic reaction in moist active charcoal.

It may, however, be equally advantageous to produce the sulphuric acid by the addition of $H_2O_2$ and/or peroxysulphuric acids to the scrubbing stage (c).

The active charcoal is sprayed with water (13) so that the sulphuric acid formed in contact with the charcoal is washed out as 2 to 20% sulphuric acid (14) and fed into the scrubber (10). In contact with the furnace gas (9), the sulphuric acid is concentrated to an $H_2SO_4$ content of 15 to 50%, depending on the quantity and concentration of the sulphuric acid (14) fed in. The quantity of 15 to 50% sulphuric acid (15) corresponding to the quantity of acid (14) introduced is discharged from the scrubber (10) and introduced into the sulphuric acid circulation which flows through the scrubber (17) provided for heating the furnace gas. In the scrubber (17), the desulphurized furnace gas (16) is reheated from a temperature of 50° to 60° C. to a temperature of 70° to 90° C. by contact with 50 to 65% sulphuric acid (18). The circulating 50 to 65% sulphuric acid leaving (19) the scrubber (17) is heated by 5 to 30 K. in the heat exchanger (5) and cooled by 5 to 30 K. in the scrubber (17). The heat given off serves both to reheat the furnace gas (16) to 70° to 90° C. (20) and to evaporate water from the 15 to 50% sulphuric acid (15) which is fed into the circulation. Pure 50 to 65% sulphuric acid (21) is discharged from the system as a by-product. This acid may, if necessary, be evaporated to concentrations of 60 to 93% in vacuum evaporators such as farced circulation evaporators.

The solid substances (22) removed from the furnace gas (1) in the scrubber (2) are separated (24) from a partial stream (23) of the solids-containing sulphuric acid. The sulphuric acid (25) now free or almost free from solids is returned to the scrubber (2).

If the exhaust gas is at a temperature in the region of 200° to 500° C., excess thermal energy may be removed by additional cooling of the circulating 70 to 80% sulphuric acid (3) by means of an external cooling agent after this acid has been partly cooled in the heat exchanger (5).

It lies within the scope of the process according to the invention to heat the purified gas to a higher temperature and to evaporate the sulphuric acid to a higher concentration by introducing the stream of sulphuric acid (18) which has been heated in the heat exchanger (5) into another heat exchanger in which it undergoes further heating by an external source of thermal energy before it is fed into the scrubber (17).

It is also within the scope of this invention to concentrate the sulphuric acid (21) more highly with little expenditure of external energy by heating only a portion of the furnace gas (16) to a high temperature with the stream of acid (18) which has undergone additional heating and then to mix this hot furnace gas with the partial stream of furnace gas (16) which has not been heated.

The advantages of the process according to the invention will now be illustrated with the aid of the Example without the invention being limited to this Example.

EXAMPLE 100,000 m$^3$/h of furnace gas (moist) from an oil-fired furnace are to be freed from dust and sulphur oxides. The furnace gas (1) contains 4.5 vol-% O$_2$, 10 vol-% steam, 4250 mg SO$_2$/m$^3$ and 150 mg dust/m$^3$. The temperature is 180° C. (Gas volumes at standard conditions, including moisture if said so.)

The furnace gas (1) is scrubbed with 76% sulphuric acid containing 0.5% by weight of solids in a scrubber (2). 160 m$^3$/h of sulphuric acid (3) are fed into the scrubber (2) at a temperature of 104° C. The sulphuric acid (4) withdrawn from the scrubber (2) at 120° C. is cooled to 104° C. in the heat exchanger (5). The furnace gas (6) leaving the scrubber (2) at a temperature of 120° C. is passed through a mist separator (7). The sulphuric acid with solids content (8) separated in this separator flows back into the scrubber (2).

The furnace gas (9) which is now free from solids and at a temperature of 120° C. is scrubbed with pure 23.9% sulphuric acid in the scrubber (10) and is at the same time cooled to 60° C. The furnace gas (11) leaves the scrubber (10) with a moisture content of 13.7 vol-% to be introduced into the desulphurizing reactor (12) in which the sulphur dioxide is converted into sulphuric acid in the presence of moist active charcoal. The active charcoal is sprayed with 5.8 t/h of water (13) to wash out the sulphuric acid formed in the reactor. 10% Sulphuric acid is discharged from the reactor at the rate of 5.855 t/h (14) and fed in the scrubber (10).

The furnace gas (16) leaving the reactor (12) is at a temperature of 52.5° C. and has a moisture content of 14 vol-% and 370 mg SO$_2$/m$^3$. This furnace gas is introduced into the scrubber (17) into which 162 m$^3$/h of pure 56.65% sulphuric acid is fed in at a temperature of 100° C. In contact with the furnace gas, the sulphuric acid is concentrated to 57% in the scrubber (17). 160.2 m$^3$/h of 57% sulphuric acid are withdrawn from the scrubber at a temperature of 85° C. An additional 2.45 g/h of 23.9% sulphuric acid (15) from the scrubber (10) is introduced into this acid stream (19), this 23.9% sulphuric acid having been obtained by the concentration by evaporation of the 10% sulphuric acid discharged from the desulphurizing reactor (12). The 56.65% sulphuric acid obtained by mixing the acid streams (19) and (15) is reheated to 100° C. in the heat exchanger (5). 1.03 t/h of pure 57% sulphuric acid (21) are discharged from the scrubber (17) as a by-product of desulphurization. The reheated furnace gas (20) is at a temperature of 85° C. and contains 370 mg of SO$_2$/m$^3$ and has a moisture content of 15.5 vol-%.

To keep the solids content in the circulating sulphuric acid down to an acceptable level in the scrubber (2), the sulphuric acid (23) which has a solids content of 0.5% by weight is filtered (24) at the rate of 2.7 t/h. The filtrate (25) is returned to the scrubber (2). 13.5 kg/h of solids (22) are discharged from the filter (24).

What is claimed is:

1. A process for the removal of dust, heavy metals contained in the dust and sulphur dioxide from hot exhaust gases which have a low hydrogen halide content and reheating of the purified exhaust gases, comprising
    (a) cooling the hot exhaust gases to temperature below 135° C. by scrubbing said gases in a scrubber with solids-containing 70–80% sulphuric acid and at the same time removing dust solids from the gases;
    (b) separating the sulphuric acid containing solids and dissolved metal sulphates from the exhaust gases from (a) and returning said sulphuric acid to the scrubber of step (a), wherein said separation is carried out in mist separators which are laminar separators;
    (c) cooling the exhaust gases from (b) to temperatures of 50°–70° C. by scrubbing said gases in a scrubber with 15–50% sulphuric acid;
    (d) desulphurizing said exhaust gases from (c) with the formation of pure sulphuric acid from the sulphur dioxide;
    (e) reheating the exhaust gases from (d) to temperatures of 70°–90° C. by scrubbing with 50–60% sulphuric acid, the pure sulphuric acid discharged from (c) being at the same time concentrated; and
    (f) cooling the solids-containing sulphuric acid from the scrubbing process (a) in heat exchangers by means of pure sulphuric acid from (e), and
    (g) taking off the pure sulfuric acid produced during desulphurization of the exhaust gases in step (d) as 50 to 65% sulphuric acid from the scrubber of step (e).

2. A process according to claim 1, wherein scrubbing of the exhaust gases in (a) is carried out with 70 to 80% sulphuric acid containing solid particles and metal sulphates.

3. A process according to claim 1, wherein the laminar separators are made of polyvinylidene difluoride.

4. A process according to claim 1, wherein the dust solids separated in (a) are removed from a partial stream of the sulphuric acid corresponding on average to 0.2 to 10% of the volume circulating through the scrubber of (a).

5. A process according to claim 1, wherein the dust solids separated in (a) are removed from a partial stream of the sulphuric acid corresponding on average to 1 to 5% of the volume circulating through the scrubber of (a).

6. A process according to claim 1, wherein the formation of pure sulphuric acid in (d) is carried out by the addition of $H_2O_2$ and/or peroxysulphuric acids to the scrubber of (c).

7. A process according to claim 1, wherein the formation of pure sulphuric acid according to (d) is carried out by a catalytic reaction in contact with moist active charcoal, and the pure sulphuric acid formed is washed out with water as a 2 to 20% solution and introduced into the scrubber of (c).

* * * * *